United States Patent [19]

Hirano et al.

[11] 4,384,215
[45] May 17, 1983

[54] CAPACITOR ELEMENT

[75] Inventors: Yutaka Hirano, Atsugi; Masahiro Hayakawa, Tokyo; Hideo Ashida, Yokohama; Hideki Ikuta, Kawasaki, all of Japan

[73] Assignee: Fujitsu Limited, Kawasaki, Japan

[21] Appl. No.: 285,472

[22] Filed: Jul. 21, 1981

[30] Foreign Application Priority Data

Jul. 21, 1980 [JP] Japan .................................. 55-99684

[51] Int. Cl.³ ............................................. H02M 3/06
[52] U.S. Cl. .................................................... 307/109
[58] Field of Search ......................... 307/109; 323/352

[56] References Cited

U.S. PATENT DOCUMENTS 1,547,242  7/1925  Strieby ........................... 307/109 X
2,195,986  4/1940  Goddard ........................ 307/109 X Primary Examiner—Donald A. Griffin
Attorney, Agent, or Firm—Staas & Halsey

[57] ABSTRACT

A capacitor for use in microwave transistor, comprises a dielectric material layer and conductive layers covering both sides of the surfaces of the dielectric material layer. A plurality of points on the surface of one of the conductive layers are connected by conduction wires. Each of the conductive wires has a length less than $\lambda_0/2\sqrt{\epsilon_r}$, where $\lambda_0$ is the minimum wavelength of electric signals applied to the capacitor element, and $\epsilon_r$ is the dielectric constant of the dielectric material layer. The middle portion of each of the conductive lines is separated from the above-mentioned one of the conductive layers. The conductive wires prevent the capacitor element from becoming extremely inductive even when the frequency is high.

8 Claims, 12 Drawing Figures

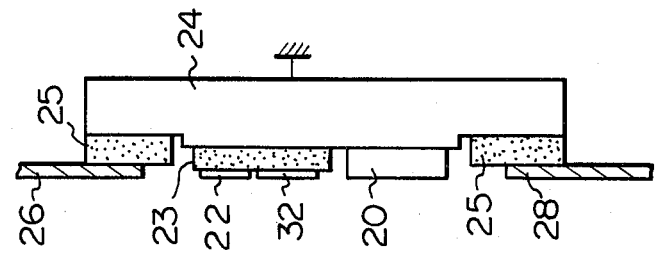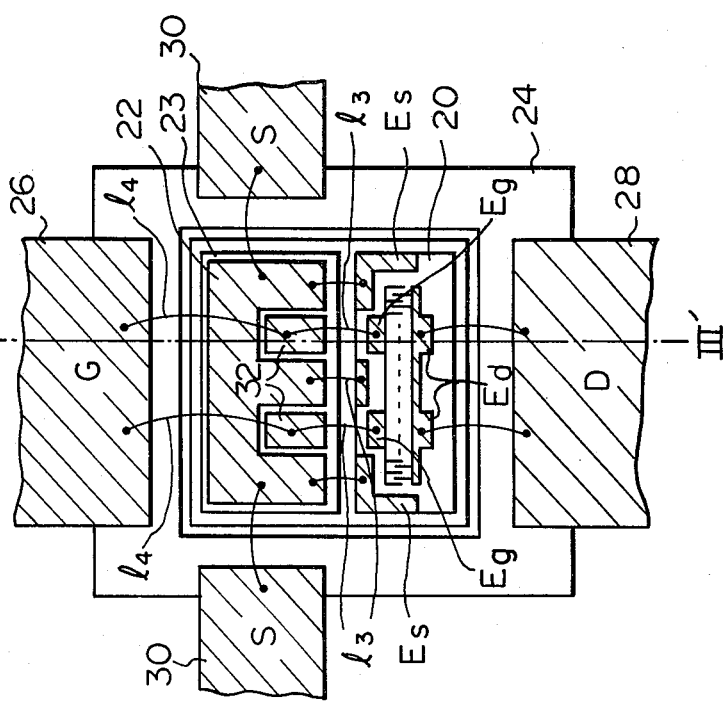

4,384,215

CAPACITOR ELEMENT

BACKGROUND OF THE INVENTION

This invention relates to a capacitor element, and more particularly to a capacitor having parallel plates with a side length of more than about one fourth of a wavelength of a signal used in a microwave integrated circuit.

In conventional microwave circuits, distributed element circuits or lumped element circuits may be used. In a distributed element circuit, parameters such as resistance, inductance and capacitance are distributed as in a transmission line, where the capacitance exists between the conductors, and the resistance and inductance are due to the conductors themselves. In contrast, in a lumped element circuit, these parameters are lumped as used in a gate or source circuit of a GaAs FET, in which the capacitance exists between a conductor and the ground, and these parameters can be treated for circuit analysis as a single inductance, capacitance, resistance, etc., when the frequency is sufficiently low. However, when the frequency used in a lumped element circuit is relatively high, especially when the size of the electrode of the capacitor is greater than or equal to about one fourth of the wavelength, the effect of size on reactance must be considered. That is, the reactance of the capacitor changes from capacitive reactance to inductive reactance. Therefore, the lumped element circuit, when used at such a high frequency, behaves as a distributed element circuit, and, accordingly, the designed values of the parameters become different from the actual values, as will be explained hereinafter in detail.

SUMMARY OF THE INVENTION

Accordingly, it is an object of the present invention to provide a capacitor element, the reactance of which does not change to an extremely large inductive reactance even when the used frequency becomes relatively high, so that the size of the electrode of the capacitor element is greater than or equal to about one fourth of the wavelength.

Another object of the present invention is to provide a capacitor element which can be used in a lumped element circuit of a microwave circuit without deteriorating the characteristics of the lumped element circuit.

In order to achieve the above objects, the present invention provides a capacitor element comprising a dielectric material layer and conductive layers covering both surfaces of the dieletric material layer, wherein a plurality of points on one of the conductive layers are connected by conductive wires, each of the conductive wires having a length less than $\lambda_0/2\sqrt{\epsilon_r}$, where $\lambda_0$ is the minimum wavelength of electric signals applied to the capacitor element, and $\epsilon_r$ is the dielectric constant of the dielectric material layer, the middle portion of each of the conductive wires being separated from the above-mentioned one of the conductive layers.

The foregoing objects and other objects as well as the characteristic features of the invention will become more apparent and more readily understandable by the following description when read in conduction with the accompanying drawings.

BRIEF DESCRIPTION OF THE DRAWINGS

FIG. 3A is a partial plan view illustrating the structure of a prior art high power self-biased GaAs FET;

FIG. 3B is a cross-sectional view taken along line III—III' of FIG. 3A;

DESCRIPTION OF THE PREFERRED EMBODIMENT

Before explaining the embodiment of the present invention, the problems in the conventional capacitor will first be explained with reference to FIGS. 1 through 7.

Figure 1:
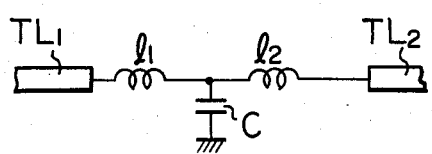
FIG. 1 is a circuit diagram, illustrating a lumped element circuit, for explaining the problem in the conventional capacitor.

FIG. 1 is a conventional circuit diagram illustrating a lumped element circuit. In FIG. 1, two strip lines $TL_1$ and $TL_2$ are connected by inductances $l_1$ and $l_2$. One electrode of a capacitor C is connected at a connecting point between the inductances $l_1$ and $l_2$. The other electrode is grounded. The lumped constant circuit of FIG. 1 constitutes a low-pass filter used in a microwave circuit.

Figure 2:
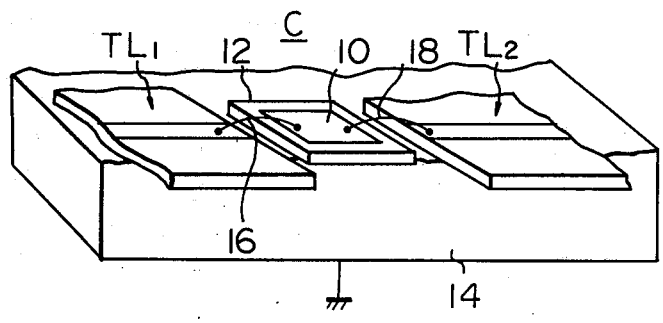
FIG. 2 is a perspective view illustrating the structure of the circuit of FIG. 1 in an integrated circuit.

In a microwave integrated circuit, the circuit of FIG. 1 is constructed as shown in FIG. 2, which is a perspective view illustrating the structure of the circuit of FIG. 1. In FIG. 2, the capacitor C is constructed by an electrode plate 10, a conductive substrate 14 made of copper and connected to ground, and a dielectric film 12 positioned between the electrode plate 10 and the conduction substrate 14. The inductances $l_1$ and $l_2$ are constituted by lead wires 16 and 18 which are connected between the electrode plate 10 and the strip lines $TL_1$ and $TL_2$, respectively.

When a conventional capacitor is used in a lumped element circuit of a microwave integrated circuit, the reactance of the circuit often tends to be different from that of the designed value. One of the reasons why the reactance is changed is that, when the wave length of the electric signal applied to the lumped element circuit is decreased to less than 4l (where l represents the side length of the electrode plate of the capacitor) the electrode plate acts as an inductance, or a transmission line, and does not act as the electrode of the capacitor.

The reason for this will be explained in detail in conjunction with a prior art high power GaAs FET used in microwave circuits. A transistor of this type is used in such a manner that a positive voltage is applied to its drain; its source is grounded; and a negative voltage is applied to its gate. However, in this connection two power supplies are required. Therefore, the source is grounded through a parallel circuit comprising a resistor and a capacitor, so as to form a so-called self-biased type circuit in which the negative voltage is not required to be applied to the gate, so that the transistor can be operated by a single power supply. The capacitor functions to ground the source by conducting alternating currents through it. However, when the frequency of the signal applied to the transistor is extremely high, the inductance of the lead wires connected to the capacitor can not be neglected. Accordingly, the positioning of the capacitors becomes an important problem.

FIG. 3A is a partial plan view illustrating the structure of a high power self-biased GaAs FET which is disclosed in U.S. patent application Ser. No. 128,655, and in the EPC patent application No. 80300574.3, both filed on May 10, 1980. FIG. 3B is a cross-sectional view taken along line III—III' of FIG. 3A. Referring to FIGS. 3A and 3B, capacitors are arranged close to the transistor. That is, in these figures, 20 represents a semiconductor chip on which a GaAs FET is formed; 22 and 32 represent the electrode plates of the capacitors; and 24 represents a grounded conductive substrate made of copper. On the conductive substrate 24, the semiconductor chip 20 is formed. Also on the conductive substrate 24, a dielectric film 23 is formed. On the dielectric film 23, the electrode plates 22 and 32 are formed. A package lead wire 26 for the gate and a package lead wire 28 for the drain are formed on the conductive substrate 24 through an insulating film 25; 30 represents a package lead wire for the source. These lead wires are connected to the gate electrode Eg, the drain electrode Ed, and the source electrode Es of the semiconductor chip 20 by wire bonding as illustrated. The gate electrode and the drain electrode have interdigitated structures as illustrated for the purpose of lowering the resistances of the electrodes, thus obtaining high power. The electrode plates 32 form capacitors for input impedance matching.

The dielectric film 23 is made of, for example, barium titanate having a dielectric constant equal to about 140. The thickness of the dielectric film 23 is about 0.15 mm.

The electrode plates 22, 32 over the dielectric film 23 or an electrode plate under the dielectric film 23 (not shown) is formed by a titanium film having a thickness of about 1 µm and covering the dielectric film 23, a palladium film having a thickness of about 1 µm and covering the titanium film, and a gold film having a thickness of about 4 µm and covering the palladium film. The capacitors are mounted on the conductive substrate 24 by adhesive made of, for example, a gold-silicon alloy.

Figure 4:
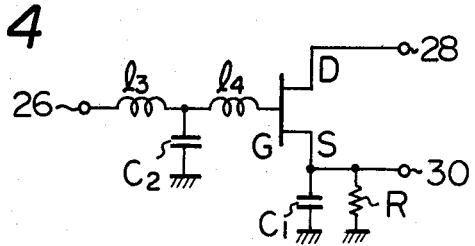
FIG. 4 is an equivalent circuit diagram of the GaAs FET of FIG. 3A.

FIG. 4 is an equivalent circuit diagram of the GaAs FET of FIG. 3A. In FIG. 4, the gate electrode of the transistor is connected through inductances $l_3$ and $l_4$ to the package lead 26. One electrode of a capacitor $C_2$ for input impedance matching is connected at a connecting point between the inductances $l_3$ and $l_4$. The other electrode of the capacitor $C_2$ is grounded. The capacitor $C_2$ is formed by the electrode plates 32, the dielectric film 23 and the conductive substrate 24 in FIGS. 3A and 3B. A capacitor $C_1$ for grounding high frequency components, or self biasing, is connected between the source electrode of the transistor and the ground. The capacitor $C_1$ is formed by the electrode plate 22, the dielectric film 23 and the conductive substrate 24 in FIGS. 3A and 3B. Also, a resistor $R_1$ for self biasing is connected in parallel to the capacitor $C_1$ in parallel. The resistor $R_1$ is formed outside of the source package lead 30 in FIG. 3A.

Because the size of the electrode plate 22 of the capacitor $C_1$ for self biasing is relatively large, the previously mentioned problem is caused, as will be explained in more detail in conjunction with FIGS. 5 through 8.

Figure 5A:
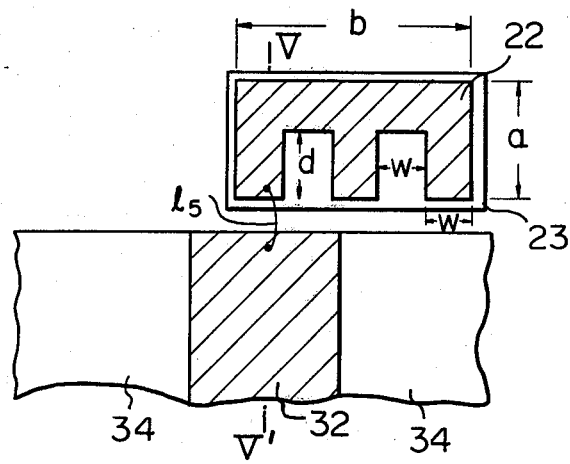
FIG. 5A is a plan view illustrating a capacitor used in the device of FIG. 3A and a measuring unit.
Figure 5B:
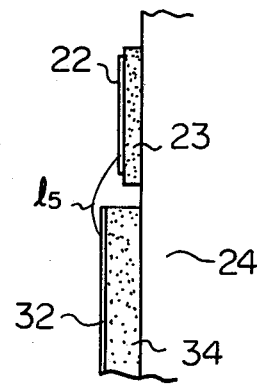
FIG. 5B is a cross-sectional view taken along line V—V' of FIG. 5A.

FIG. 5A is a plan view illustrating the capacitor $C_1$ for self biasing used in the device of FIG. 3A. FIG. 5B is a cross-sectional view taken along line V-V' of FIG. 5A. Referring to FIGS. 5A and 5B, the electrode plate 22 formed on the dielectric film 23 is electrically connected by a wire $l_5$ to a measuring lead or a strip line 32 which is formed on another insulating film 34. The insulating film 34 is made of alumina ($Al_2O_3$) having a thickness of about 0.65 mm. The strip line 32 is made of metal, for example, the nichrome-gold series. As shown in FIG. 5A, the electrode plate 22 has recesses. Each recess has a depth d of 0.4 mm and a width w of 0.3 mm. The width w of the recess is equal to the width of a convex.

Figure 6:
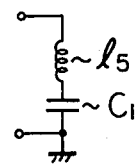
FIG. 6 is an equivalent circuit of the device of FIG. 5.
Figure 7:
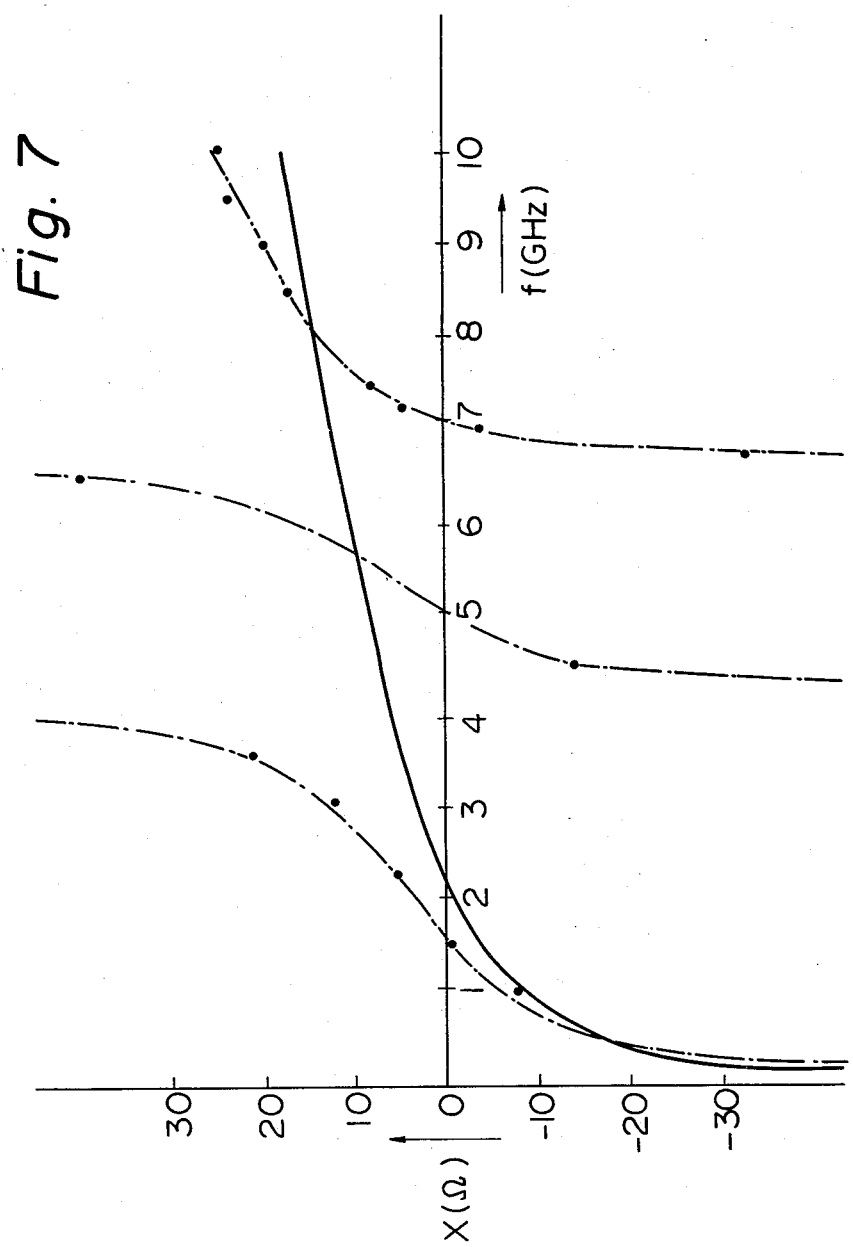
FIG. 7 is a graph illustrating the designed relationship and the actual relationship between the frequency and the reactance of the capacitor of FIG. 5.

FIG. 6 is an equivalent circuit diagram of the capacitor of FIG. 5. In FIG. 6, the capacity of the capacitor $C_1$ at a sufficiently low frequency is about 17.5pF. The inductance of the wire $l_5$ is about 0.3nH. Therefore, the reactance X due to the capacitor $C_1$ and the wire $l_5$ may be calculated as:

$$X = j\omega L + \frac{1}{j\omega c} = j\omega \times 0.3 \times 10^{-9} + \frac{1}{j\omega \times 17.5 \times 10^{-12}} \ (\Omega),$$

where, $\omega$ represents an angular frequency. The relation between the frequency and the reactance obtained from the above calculation is shown in FIG. 7 by a solid curve, in which, the reactance is capacitive when the frequency f is below 2.25GHz and the reactance is inductive when the frequency f is above 2.25GHz.

Figure 8:
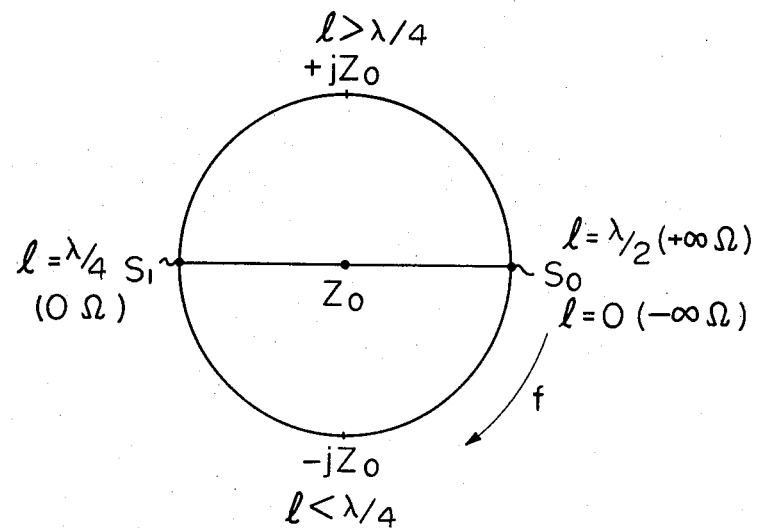
FIG. 8 is a Smith chart for explaining the impedance of the capacitor of FIG. 5.

However, the actual reactance X due to the capacitor $C_1$ and the wire $l_5$ is different from the calculated reactance. The relation between the actual reactance and the frequency is illustrated in FIG. 7 by dashdot curves. This difference is caused mainly because, when the frequency is sufficiently high, the electrode plate 22 acts as a transmission line and does not act as the electrode of the capacitor $C_1$ as previously mentioned. More particularly, assume that the length of the capacitor $C_1$ is $2a+b$ as shown in FIG. 5A, the wavelength of the input signal applied to the gate of the transistor is $\lambda_0$, and the dielectric constant is $\epsilon_r$. Then, the wavelength $\lambda$ of the input signal in the insulating film 23 is equal to $\lambda_0/\sqrt{\epsilon_r}$. When the frequency of the input signal becomes higher, the wavelength will then become shorter in comparison with the side length $2a+b$ of the electrode plate 22 of the capacitor $C_1$. This will be easily understood from FIG. 8 which is a Smith chart of the equivalent circuit of FIG. 6. Referring to FIG. 8, when the frequency is sufficiently low so that the value $\lambda/4$ is much larger than $2a+b$, the reactance is negatively infinite as illustrated at a point $S_0$, i.e., the electrode plate 22 of the capacitor $C_1$ (FIG. 5) provides an open-circuit impedance. When the frequency is relatively low so that the value $\lambda/4$ is larger than $2a+b$, the reactance is capacitive, i.e., the inductance due to the electrode plate 22 can be neglected. When the frequency is increased so that the value $\lambda/4$ is equal to $2a+b$, the reactance is substantially equal to zero as illustrated at a point $S_1$, i.e., the electrode plate 22 of the capacitance $C_1$ provides a short-circuit impedance. When the frequency is increased so that the value $\lambda/4$ is smaller than $2a+b$, the reactance becomes inductive. When the frequency is further increased so that the value $\lambda/2$ is equal to $2a+b$, the reactance is possitively infinite as illustrated at the point $S_0$, i.e., the electrode plate 22 again provides an open-circuit impedance. Accordingly, as illustrated in FIG. 7 by dash-dot curves, actual reactances repeatedly vary from negative infinity to positive infinity. This problem will be further described as follows by using actual values.

The length of the electrode plate 22 is about 3 mm ($a=0.75$ mm, $b=1.5$ mm). The dielectric constant $\epsilon_r$ is about 140. When the measurement frequency f is 4 GHz, the value $\lambda_0/2$ is equal to about 36 mm, and accordingly, the value $\lambda/2 = \lambda_0/2\sqrt{\epsilon_r}$ is equal to about 3 mm which is the length of the electrode plate 22. Therefore, if the wire $l_5$ is bonded to the electrode plate 22 as illustrated in FIG. 5, the capacitor $C_1$ does not act as a capacitor but provides an open-circuit impedance.

Referring back to FIG. 4, if the source of the transistor has such an infinite inductive impedance, the transistor will cause an oscillation because currents cannot flow from the drain to the source but flow back to the gate, that is, feed-back becomes greater.

The present invention provides a capacitor in which the reactance does not change to an extremely large inductive reactance. Now, an embodiment of the present invention will be described with reference to FIGS. 9 and 10.

Figure 9:
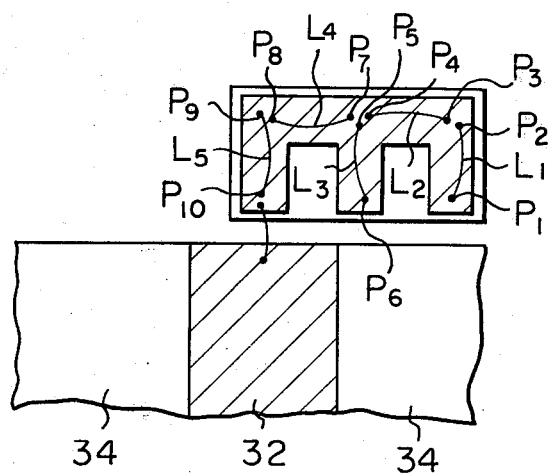
FIG. 9 is a plan view illustrating a capacitor according to an embodiment of the present invention.

FIG. 9 is a plan view ilustrating a capacitor $C_0$ and a measuring unit, which corresponds to the conventional capacitor illustrated in FIG. 5. The difference between FIG. 5 and FIG. 9 is that, in FIG. 9, conductive wires $L_1$, $L_2$, $L_3$, $L_4$ and $L_5$ are connected on the electrode plate 22 by wire bonding at points $P_1$ through $P_{10}$. Each of the conductive wires $L_1$ through $L_5$ between the points $P_1$ and $P_2$, $P_3$ and $P_4$, $P_5$ and $P_6$, $P_7$ and $P_8$, and $P_9$ and $P_{10}$, respectively, is made of a gold wire having a diameter of 25 μm and a dielectric constant $\epsilon_r$ substantially equal to 1, because the middle portion of each of the conductive wires $L_1$ through $L_5$ is separated from the electrode plate 22. The length of each of the conductive wires $L_1$ through $L_5$ is less than $\lambda_0/2\sqrt{\epsilon_r}$, where, $\lambda_0$ represents the maximum wavelength of electric signals applied to the electrode plate 22 of the capacitor, and $\epsilon_r$ represents the dielectric constant of the insulating film 24. In this structure we can regard the wavelength along a wire as that in air. By this construction, because many points on the electrode plate 22 are short circuited by the conductive wires $L_1$ through $L_5$, each having a length less than $\lambda_0/2\sqrt{\epsilon_r}$, the capacitor $C_0$ according to this embodiment does not have an infinite inductive impedance as does the conventional capacitor $C_1$, even when the frequency of an electric signal applied to the electrode plate 22 is high, so that the length $2a+b$ of the electrode plate 22 is larger than $\lambda_0/4\sqrt{\epsilon_r}$. It is preferable that the length of each of the conductive wires $L_1$ through $L_5$ is less than $\lambda_0/4\sqrt{\epsilon_r}$.

Under this condition, the capacitor $C_0$ acts only as a capacitor and does not have a transmission line characteristic.

Further, it is sufficient that the length of each of the conductive wires be less than $\lambda_0/4$.

Figure 10:
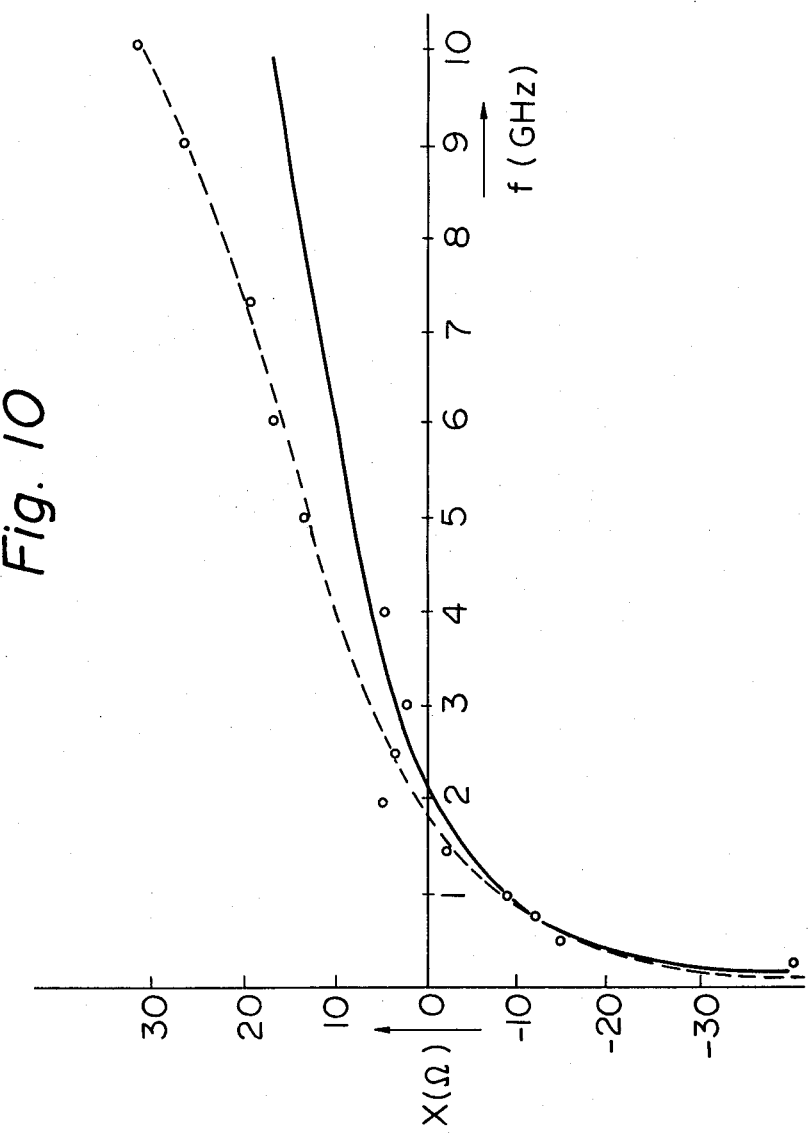
FIG. 10 is a graph illustrating the designed relationship and the experimental relationship between the frequency and the reactance of the capacitor of FIG. 7.

FIG. 10 is a graph illustrating an experimental relation between the frequency and the reactance of the capacitor $C_0$ of FIG. 9, in comparison with the designed relation. Referring to FIG. 10, the designed relation is again illustrated by a solid curve. The dotted curve represents the experimental relation. As will be apparent from FIG. 10, the experimental relation is quite similar to the designed relation.

From the foregoing description, it will be apparent that, according to the present invention, by means of a simple technique of forming shorts, between the center and a side or between sides of an electrode plate of a capacitor, by wires, the middle portions of which are separated from the electrode plate, the capacitor can be used at a higher frewquency than prior art capacitors. Thus a capacitor useful for microwave transistor circuits is obtained.

The present invention is not restricted to the illustrated embodiment, but may be applied to any capacitor for high frequency.

We claim:

1. A capacitor element for receiving electric signals having a minimum wavelength of $\lambda_0$, comprising:
    a dielectric material layer having a dielectric constant $\epsilon_r$ and having first and second main surfaces;
    first and second conductive layers covering said first and second main surfaces of said dielectric material layer; and
    one or more conductive wires electrically connecting a plurality of points on said first conductive layer, each of said one or more conductive wires connecting two points separated by a distance less than $\lambda_0/2\epsilon_r$, each of said one or more conductive wires having a middle portion which is separated from said first conductive layer.

2. A capacitor element as set forth in claim 1, wherein the distance between two points connected by each of said one or more conductive wires is less than $\lambda_0/4\epsilon_r$.

3. A capacitor element as set forth in claim 1 or 2, wherein the length of each of said one or more conductive wires is less than $\lambda_0/4$.

4. A capacitor element as set forth in claim 1 or 2, wherein each of said one or more conductive wires is connected to said first conductive layer by wire bonding at two of said points.

5. A capacitor element as set forth in claim 1 or 2, wherein said capacitor element is a self-biasing capacitor connected to the source electrode of a high-power GaAs FET.

6. A capacitor element as set forth in claim 1 or 2, wherein each of said one or more conductive wires is a gold wire.

7. A capacitor element as set forth in claim 6, wherein each of said one or more conductive wires has a dielectric constant which is substantially equal to one.

8. A capacitor element as set forth in claim 7, wherein each of said one or more conductive wires has a diameter which is substantially equal to 25 micrometers.

* * * * *

UNITED STATES PATENT AND TRADEMARK OFFICE
CERTIFICATE OF CORRECTION

PATENT NO. : 4,384,215
DATED      : MAY 17, 1983
INVENTOR(S) : YUTAKA HIRANO ET AL.

It is certified that error appears in the above-identified patent and that said Letters Patent is hereby corrected as shown below:

Front page, [75] Inventors, "Ikuta, Kawasaki" should be
--Ikuta, Yokohama--;

[57] ABSTRACT, line 1, after "transistor" insert --circuits--.

Col. 1, line 24, "ficientely" should be --ficiently--.
Col. 3, line 40, after "structures" insert --,--; after "illustrated" insert --,--.
Col. 4, line 4, delete "in parallel" (second occurrence).
Col. 6, line 20, "frewquency" should be --frequency--.

Signed and Sealed this

Sixth Day of March 1984

[SEAL]

Attest:

Attesting Officer

GERALD J. MOSSINGHOFF

Commissioner of Patents and Trademarks